US010089477B2

(12) United States Patent
Kim et al.

(10) Patent No.: US 10,089,477 B2
(45) Date of Patent: Oct. 2, 2018

(54) TEXT MESSAGE MANAGEMENT (71) Applicant: KT Corporation, Seongnam-si, Gyeonggi-do (KR)

(72) Inventors: Seokhong Kim, Seoul (KR); Jung-suk Park, Seoul (KR); Jung-wook Lee, Gwangmyeong-si (KR); Jae-uk Cha, Seongnam-si (KR)

(73) Assignee: KT Corporation, Seongnam-si, Gyeonggi-Do (KR)

( * ) Notice: Subject to any disclaimer, the term of this patent is extended or adjusted under 35 U.S.C. 154(b) by 154 days.

(21) Appl. No.: 14/972,551

(22) Filed: Dec. 17, 2015

(65) Prior Publication Data

US 2016/0180098 A1 Jun. 23, 2016

(30) Foreign Application Priority Data

Dec. 17, 2014 (KR) .......................... 10-2014-0182238

(51) Int. Cl.
| | |
|---|---|
| *G06F 21/60* | (2013.01) |
| *H04L 29/08* | (2006.01) |
| *H04W 12/12* | (2009.01) |
| *H04W 8/18* | (2009.01) |
| *H04L 29/06* | (2006.01) |
| *H04W 12/10* | (2009.01) |
| *H04W 12/02* | (2009.01) |

(52) U.S. Cl.
CPC .......... *G06F 21/602* (2013.01); *G06F 21/606* (2013.01); *H04L 63/0245* (2013.01); *H04L 67/303* (2013.01); *H04W 8/18* (2013.01); *H04W 12/12* (2013.01); *H04L 63/105* (2013.01); *H04L 63/123* (2013.01); *H04L 67/02* (2013.01); *H04W 12/02* (2013.01); *H04W 12/10* (2013.01)

(58) Field of Classification Search
None
See application file for complete search history.

(56) References Cited

U.S. PATENT DOCUMENTS

| | | | | | |
|---|---|---|---|---|---|
| 4,962,532 | A | * | 10/1990 | Kasiraj | ................ G06Q 10/107 713/166 |
| 7,251,728 | B2 | * | 7/2007 | Toh | ......................... G06F 21/64 380/30 |

(Continued)

FOREIGN PATENT DOCUMENTS

| | | |
|---|---|---|
| KR | 10-2010-0012567 A | 2/2010 |
| KR | 10-2011-0117875 A | 10/2011 |

(Continued)

*Primary Examiner* — Saleh Najjar
*Assistant Examiner* — Michael W Chao
(74) *Attorney, Agent, or Firm* — Brundidge & Stanger, P.C.

(57) ABSTRACT

A text management system may include a text message transmission server that transmits a message received from a first device to a second device. The text message transmission server may include a device manager that manages device information of the second device, a receiver that receives a message from the first device, a message manager that determines a transmission path of the message to the second device based on the device information of the second device, and a transmitter that transmits, to the second device, the message along the determined transmission path.

16 Claims, 7 Drawing Sheets

(56) References Cited

U.S. PATENT DOCUMENTS

| | | | | |
|---|---|---|---|---|
| 8,621,608 B2* | 12/2013 | Dalcher | .............. | H04L 63/1425 |
| | | | | 709/217 |
| 8,695,093 B2* | 4/2014 | Liu | ........................ | H04L 61/30 |
| | | | | 707/782 |
| 8,806,593 B1* | 8/2014 | Raphel | .................... | H04L 63/20 |
| | | | | 726/6 |
| 9,813,419 B2* | 11/2017 | Steinberg | ................ | H04L 63/10 |
| 9,838,427 B2* | 12/2017 | Quinlan | .............. | H04L 63/1491 |
| 9,866,396 B2* | 1/2018 | Buckley | .............. | H04L 9/3252 |
| 9,936,018 B2* | 4/2018 | Kulkarni | ............. | H04L 67/1095 |
| 2004/0133774 A1* | 7/2004 | Callas | ................. | H04L 63/0428 |
| | | | | 713/153 |
| 2006/0281474 A1* | 12/2006 | Domville | .............. | H04L 51/066 |
| | | | | 455/466 |
| 2008/0163372 A1* | 7/2008 | Wang | ...................... | G06F 21/56 |
| | | | | 726/24 |
| 2008/0301796 A1* | 12/2008 | Holostov | .............. | H04L 63/105 |
| | | | | 726/12 |
| 2009/0030997 A1* | 1/2009 | Malik | .................. | G06Q 10/107 |
| | | | | 709/206 |
| 2010/0299394 A1* | 11/2010 | Jania | .................... | G06Q 10/107 |
| | | | | 709/206 |
| 2011/0289434 A1* | 11/2011 | Kieft | .................. | G06F 17/30887 |
| | | | | 715/760 |
| 2014/0006772 A1* | 1/2014 | Qureshi | .................. | G06F 21/10 |
| | | | | 713/150 |
| 2014/0122567 A1* | 5/2014 | Suryavanshi | ..... | G06F 17/30887 |
| | | | | 709/203 |
| 2014/0181216 A1* | 6/2014 | Liebmann | ............... | H04L 51/12 |
| | | | | 709/206 |
| 2015/0011186 A1* | 1/2015 | Yoon | ...................... | H04W 4/14 |
| | | | | 455/410 |
| 2016/0337379 A1* | 11/2016 | Godlewski | ............ | G06F 21/554 |
| 2017/0237776 A1* | 8/2017 | Higbee | ............... | H04L 63/1483 |
| | | | | 726/1 |
| 2017/0374072 A1* | 12/2017 | Steinberg | ................ | H04L 63/20 |
| 2018/0041633 A1* | 2/2018 | Velthuis | .................. | H04L 51/12 |
| 2018/0109389 A1* | 4/2018 | Buckley | .................... | H04L 9/14 |

FOREIGN PATENT DOCUMENTS

| | | |
|---|---|---|
| KR | 10-2012-0122593 A | 11/2012 |
| KR | 10-2013-0016542 A | 2/2013 |
| KR | 10-2013-0089820 A | 8/2013 |
| KR | 10-2014-0050623 A | 4/2014 |

\* cited by examiner

TEXT MESSAGE MANAGEMENT

BACKGROUND

In recent years, text message services have expanded beyond message exchange between individuals to include the exchange of sensitive information. As such, the need for security for text messages has increased. However, most text message exchanges are conducted between conventional smart phones on which the contents of a text message may be leaked.

SUMMARY

In one example embodiment, a text management system includes a text message transmission server that transmits a message received from a first device to a second device. The text message transmission server may include a device manager that may manage device information of the second device, a receiver that may receive a message from the first device, a message manager that may determine a transmission path of the message to the second device based on the device information of the second device, and a transmitter that may transmit, to the second device, the message along the determined transmission path.

In another example embodiment, a method, implemented by a text message transmission server, includes managing device information of a second device, receiving a message from a first device, determining a transmission path of the message to the second device based on the managed device information of the second device, and transmitting the message to the second device along the determined transmission path.

In yet another example embodiment, a computer-readable storage medium stores computer-executable instructions that, when executed, cause a server to receive a message from a first device, manage information corresponding to a second device, determine a transmission path for the message to the second device based on the managed device information, and transmit the message along the determined transmission path to the second device.

BRIEF DESCRIPTION OF THE DRAWINGS

In the detailed description that follows, embodiments are described as illustrations only since various changes and modifications will become apparent to those skilled in the art from the following detailed description. The use of the same reference numbers in different figures indicates similar or identical items.

DETAILED DESCRIPTION

In accordance with any one of the above-described exemplary embodiments, it is possible to provide a message transfer system, method and computer program capable of varying a message transfer path depending on a kind of a message to be received. It is possible to provide a message transfer system, method and computer program capable of efficiently suppressing leakage of a message by determining a message transfer path depending on a likelihood of leakage of the message in a receiving device.

Figure 1:
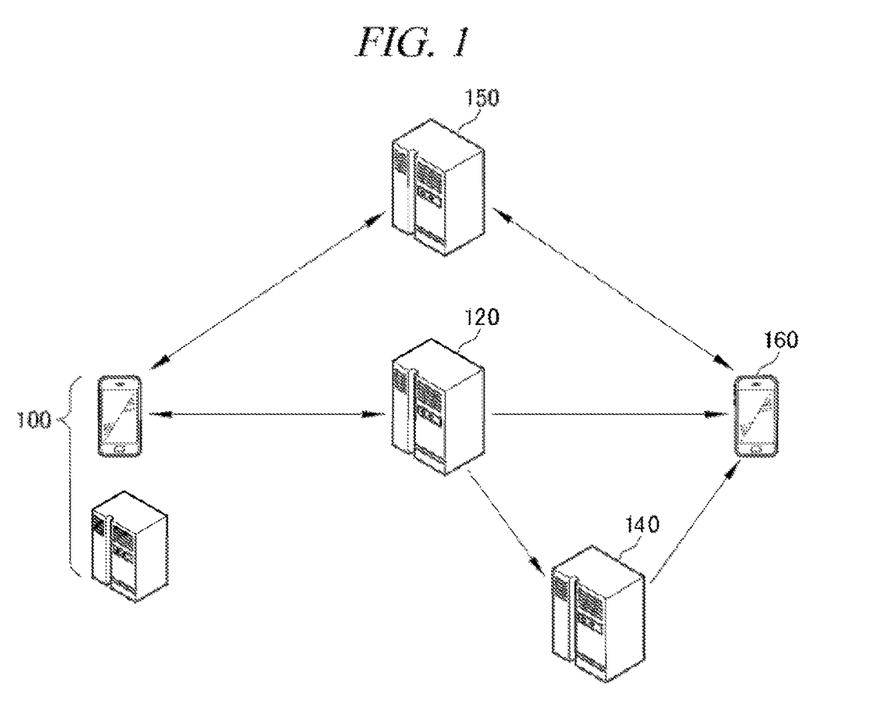
FIG. 1 is a configuration view of a system for transferring a message, in accordance with example embodiments of text message management described herein.

FIG. 1 is a configuration view of a system for transferring a message in accordance with example embodiments of test message management described herein. Message transfer system 1 may include a transmitting device 100, a text message transmission server 120, a security server 140, a content storage sever 150 and receiving device 160.

As referenced herein, a text message may refer to a message based on Short Message Service (SMS), Long Message Service (LMS), Multimedia Messaging service (MMS) and various Instant message services.

Non-limiting examples of transmitting device 100, as well as receiving devices 160, may include, but not be limited to, a notebook computer, a personal computer, a smart phone, a remote controller, a tablet computer, a phablet device, or a personal communication terminal, such as PCS (Personal Communication System), GMS (Global System for Mobile communications), PDC (Personal Digital Cellular), PDA (Personal Digital Assistant), IMT (International Mobile Telecommunication)-2000, CDMA (Code Division Multiple Access)-2000, W-CDMA (W-Code Division Multiple Access) and Wibro (Wireless Broadband Internet) terminal. Further, the embodiments of text message management, including the embodiments of devices 100 and 160, are not to be interpreted to be limited in quantity as shown in FIG. 1. Alternative embodiments may include different quantities, and the illustrated examples are non-limiting examples.

Text message transmission server 120 may refer to a server or other computing device that may be configured, programmed, and/or designed to receive at least one text message from the transmitting device 100 and to transfer any of such received messages to either of receiving device 160. After receiving the message from transmitting device 100, text message transmission server 120 may determine a message transmission path based on the device information of receiving device 160. That is, device information regarding receiving device 160, stored in text message transmission server 120, may be compared to device information stored therein. Based on a match between the compared device information, a transmission path to receiving device 160 may be determined. Herein, the device information regarding the receiving device 160 may include identifying information regarding an operating system (OS) operating on the receiving devices or identifying information regarding a device model of the respective receiving devices.

Additionally, or alternatively, text message transmission server 120 may be configured, programmed, and/or designed to determine a security level of receiving device 160 based on the device information of receiving device 160. Thus, the transmission path to receiving device 160 may be further or alternatively determined based on the determined security level of receiving device 160.

Further still, text message transmission server 120 may be configured, programmed, and/or designed to detect or determine whether or not receiving device 160 is in an available state to receive the message. Thus, the transmission path to receiving device 160 may be further or alternatively determined based on the detected or determined availability state of receiving device 160.

Text message transmission server 120 may determine a level of security vulnerability, e.g., likelihood of leakage, of the message upon transmission to receiving device 160, using the respective device information. If it is determined that the vulnerability of a message transmitted to receiving device 160 is low, text message transmission server 120 may directly transfer the message to receiving device 160. If it is determined that the vulnerability of a message sent to receiving device 160 is high, text message transmission server 120 may transfer the message to receiving device 160 via security server 140.

For example, smart phones may be applied with different policies about a right to receive or access a message depending on an operating system or the device model. Thus, each device may have a different level of security vulnerability regarding the possibility of a message being accessed without authorization. Therefore, by varying a path or method for transmitting a message to a specific device unit, it is possible to efficiently reduce the vulnerability of a message sent to a particular device, i.e., reduce the likelihood of unauthorized access to the message or of the message being accessed inadvertently by another application on receiving device 160 or a different device.

Text message transmission server 120 may further manage the device information of receiving device 160. Such device information may include, for example, information identifying an operating system (OS) operating on receiving device 160 and/or information identifying a device model of receiving device 160.

Security server 140 may refer to a server or other computing device that is configured, programmed, and/or designed to receive a message from the text message transmission server 120, store the message therein, and provide a message security service, e.g., encryption or authentication of the message. Security server 140 may check one or more of whether or not receiving device 160 subscribes to a security service, identify applications that are installed on receiving device 160, and determine whether or not receiving device 160 can safely receive the message. If a corresponding security application is identified on receiving device 160, security server 140 may provide a security service, e.g., encryption and/or authentication of the message, and transmit or relay the message to receiving device 160. Whether or not the receiving device 160 can receive a message may depend on issuance of an encryption key, overseas roaming, power ON/OFF, suspension of the service, and the like. That is, security server 140 may determine whether the message, once subjected to the aforementioned security service, may be properly managed on receiving device 160.

Since security server 140 may encrypt a message before transmitting the message to receiving device 160, all of messages to be transmitted or transferred to receiving device 160 with a high level of vulnerability can be protected.

Security server 140 may manage a list of secure applications and suppress leakage of a message by performing unicast/multicast to the secure applications or by allowing the secure applications to access a decryption module.

Security server 140 may authenticate contents contained in a message intended to be transmitted to receiving device 160. If the contents include a URL, security server 140 may authenticate a web page linked to the URL and determine whether or not the URL pertains to an installation of an application. Security server 140 may authenticate the URL by examining or determining whether the URL includes malicious code and/or whether the URL relates to an application.

Security server 140 may cause the URL to be displayed in various ways depending on a result of the URL authentication. For example, if the URL is authenticated, security server 140 may cause a link to the URL may be displayed as a button. If the URL is not authenticated, security server 140 may cause the URL to be displayed as a string with no link provided. Alternative embodiments may, for example, include a link accompanied by a warning or disclaimer.

In another alternative embodiment, if the URL is not authenticated, security server 140 may cause a preview, e.g., screenshot, of a web page corresponding to the URL to be displayed or security server 140 may cause a corresponding page in mirroring website of the original site to be displayed.

Security server 140 is configured, programmed, and/or designed to authenticate the URL contained in the received message, and therefore may inform a user as to whether or not malicious code and/or unverified sites or applications are linked to in the message. Thus, it is possible to suppress smishing which often occurs through a message containing a URL.

Receiving device 160 may be provided with a message security service if receiving device 160 receives a message security service by subscription to the service, installation of the application, and the like.

Message transfer system 1 may further include a content storage server 150.

Content storage server 150 may be configured, programmed, and/or designed to receive contents from the transmitting device 100, store the received contents in the server, and provide a URI (Uniform Resource Identifier) to enable access to the contents by transmitting device 100.

Content storage server 150 may be configured, programmed, and/or designed to transfer the stored contents to receiving device 160. Receiving device 160 may receive the URI from the transmitting device 100 and transmit a request for contents with the URI to content storage server 150. The text message transmission server or service providing server may cause the received URI to be displayed as a button. If the user selects, clicks on, or activates the button, content storage server 150 may directly transfer the contents to receiving device 160.

Content storage server 150 may also be configured, programmed, and/or designed to authenticate the stored contents. Configured as a smartphone, receiving device 160 may be vulnerable to security risks, i.e., have a high likelihood of leakage, and may thereby be provided with a security service application hosted or otherwise stored thereon.

Text message transmission server 120 may determine whether or not receiving device 160 is in a state capable of receiving the message. As referenced herein, a state of receiving device may refer to on/off of the receiving device 160, a network condition of the receiving device 160 or the like.

If text message transmission server 120 determines that receiving device 160 is not in a state capable of receiving the message, text message transmission server 120 may keep the message. Text message transmission server 120 may then periodically check to determine whether or not receiving device 160 is changed into a state in which the device is capable of receiving the message, and may then request that the stored message be transferred.

Figure 2:
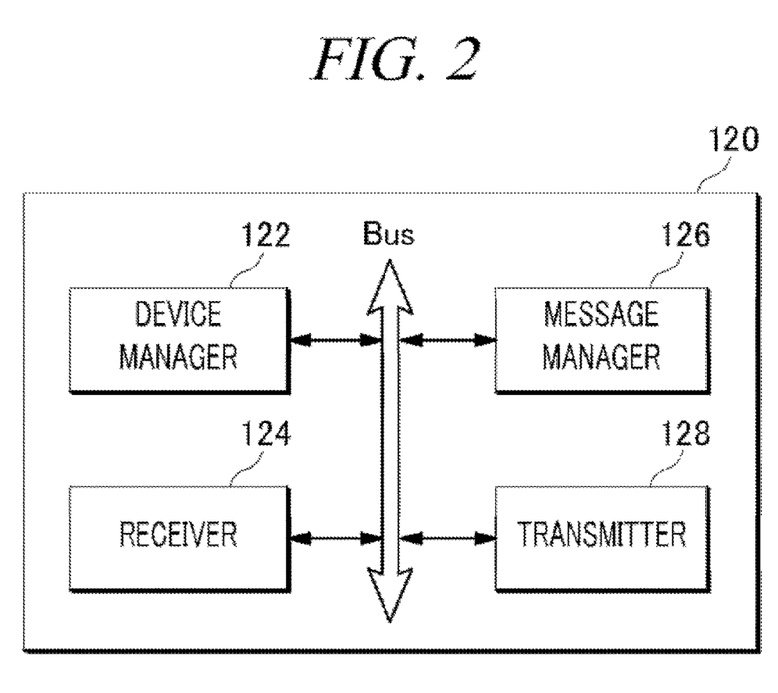
FIG. 2 is a block diagram of a text message transmission server, in accordance with examples of text message management described herein.

FIG. 2 is a block diagram of a text message transmission server, in accordance with examples of text message management described herein. Although illustrated as discrete components, various components may be divided into additional components, combined into fewer components, or eliminated altogether while being contemplated within the scope of the disclosed subject matter. It will be understood by those skilled in the art that each function and/or operation of the components may be implemented, individually and/or collectively, by a wide range of hardware, software, firmware, or virtually any combination thereof. These components may be implemented in a computing environment relative to text message transmission server 120, and may be stored in a corresponding memory storage device. For purposes of illustration, the application or program, including executable program components, corresponding to text message transmission server 120 are illustrated herein as discrete blocks, although it is recognized that such programs and components reside at various times in different storage components of the corresponding client device, and may be executed by at least one data processor of the computer.

Device manager 122 may be configured, programmed, and/or designed to manage information for receiving device 160. Such information may, at least, identify an operating system (OS) that runs on receiving device 160 and/or a device model of receiving device 160. Such device model information may include a brand name, model number, SKU (stock keeping unit) number, etc. Additionally, or alternatively, device manager 122 may be configured, programmed, and/or designed to determine a security level of receiving device 160 based on the device information of receiving device 160. Further still, device manager 122 may be configured, programmed, and/or designed to detect or determine whether or not receiving device 160 is capable of receiving the message based on any one or more factors including, but not limited to, any portion of the device information, the security information, and/or a current state of availability.

Receiver 124 may be configured, programmed, and/or designed to receive a message from transmitting device 100.

Message manager 126 may be configured, programmed, and/or designed to determine a transmission path for the message to the second device based on, at least, a portion of the device information of receiving device 160. Additionally, or alternatively, the transmission path to receiving device 160 may be determined based on the determined security level of receiving device 160. Even further, the transmission path to receiving device 160 may be determined based on the determination by device manager 122 as to whether receiving device is capable and/or available to receive the message.

As referenced herein, the determined transmission path may include, e.g., direct transmission from message transmission server 120 to receiving device 160 or transmission from message transmission server 120 to receiving device 160 via security server 140.

Transmitter 128 may be configured, programmed, and/or designed to transmit the message, to receiving device 160, along the transmission path determined by message manager 126.

Figure 3:
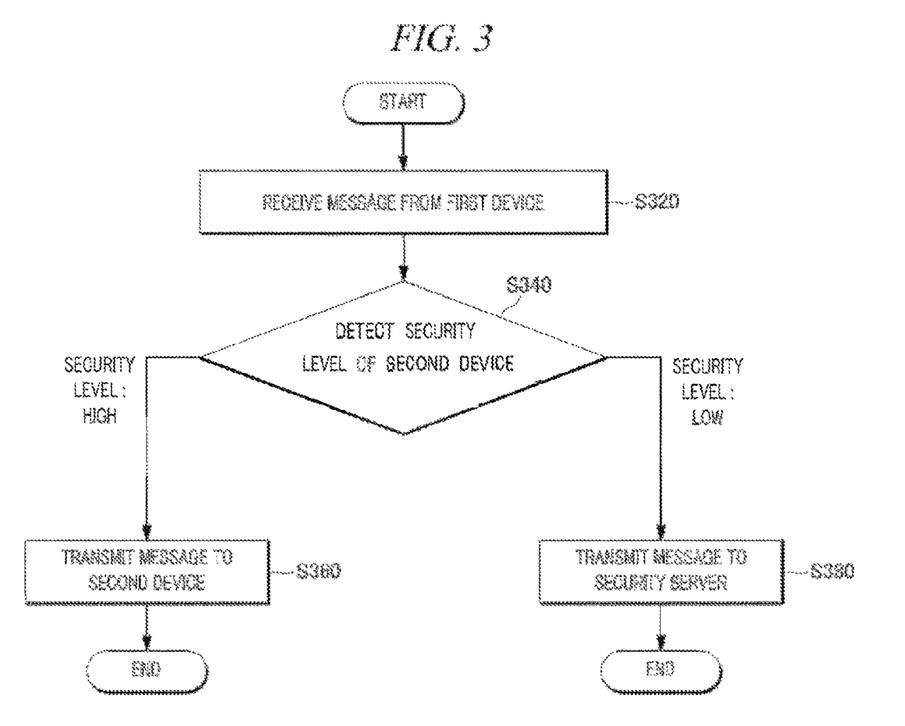
FIG. 3 is a flow diagram of operations implemented for text message management, in accordance with examples of text message management described herein.

FIG. 3 is a flow diagram of operations implemented for text message management, in accordance with examples of text message management described herein. The operations of the processing flow may be implemented in system configuration 1 including servers 120 and 140, as illustrated in FIG. 1. The processing flow may include one or more operations, actions, or functions as illustrated by one or more blocks, 320, 340, 360, and/or 380. Although illustrated as discrete blocks, various blocks may be divided into additional blocks, combined into fewer blocks, or eliminated, depending on the desired implementation. Processing may begin at block 320.

Block S320 (Receive Message from First Device) may refer to receiver 124 receiving a message from transmitting device 100. Processing may proceed from block S320 to decision block S340.

Decision block S340 (Detect Security Level of Second Device) may refer to device manager 122 detecting or determining a security level of receiving device 160 based on, e.g., device information pertaining to device 160. The device information may, at least, identify an operating system (OS) that runs on receiving device 160 and/or a device model of receiving device 160, e.g., brand name, model number, SKU number, etc.

Thus, text message transmission server 120 may determine that the security level of receiving device 160 is HIGH and, therefore, message manager 126 may determine that the transmission path for the message may be directly to receiving device 160. In that event, processing may proceed from decision block S340 to block S360.

Alternatively, text message transmission server 120 may determine that the security level of receiving device 160 is LOW and, therefore, message manager 126 may determine that the transmission path for the message may be to receiving device 160 via security server 140. In that event, processing may proceed from decision block S340 to block S380.

Block S360 (HIGH: Transmit Message to Second Device) may refer to message manager 126 determining a direct transmission path for the message and transmitter 128 transmitting the message directly to receiving device 160.

Block 380 (LOW: Transmit Message to Security Server) may refer to message manager 126 determining an indirect transmission path for the message and transmitter 128 transmitting the message to security server 140 prior before it may be received at receiving device 160.

Figure 4:
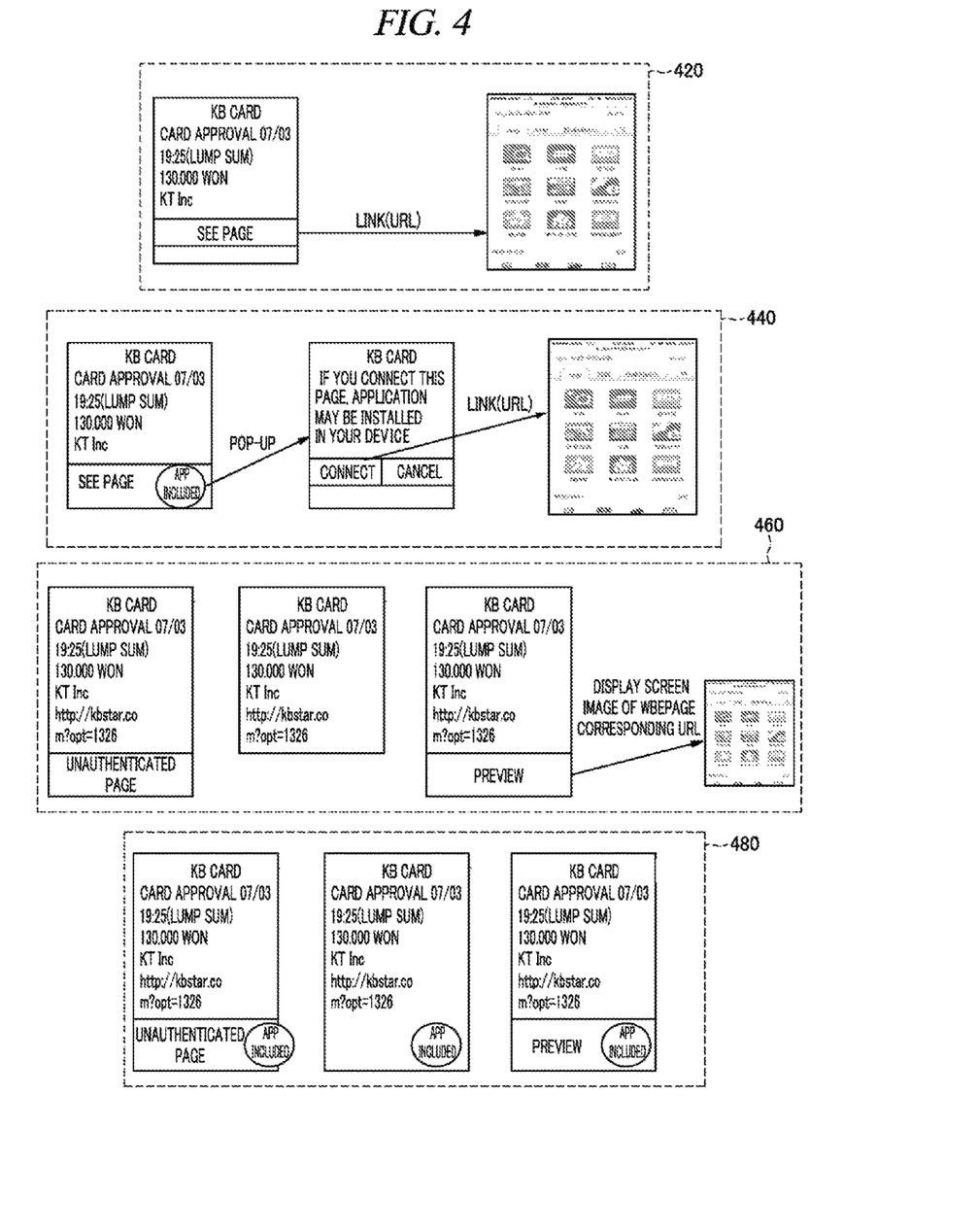
FIG. 4 is a diagram provided to explain a method for displaying a result of URL authentication in accordance with an exemplary embodiment.

FIG. 4 is a diagram provided to explain a method for displaying a result of URL authentication in accordance with at least one embodiment. As set forth above, text message transmission server 120 in accordance with an exemplary embodiment may detect or determine whether or not a URL contained in a message is authenticated and/or includes or otherwise pertains to an application. Text message transmission server 120 may cause the URL to be displayed in different ways depending on a result of the determination.

Block 420 illustrates an example of a screen displaying a URL when an authenticated URL does not include and/or pertain to an application. In this case, text message transmission server 120 may cause the URL to be displayed as a button, or a link, thus enabling access to a web page if the button is selected.

Block 440 illustrates an example of a screen displaying a URL when an authenticated URL includes and/or pertains to an application. In this case, text message transmission server 120 may cause the URL to be displayed as a button and also cause at least a portion of the application to be displayed. If a user selects the button, the user may access to a web page through, e.g., a popup notification that the application can be installed.

Block 460 illustrates an example of a screen displaying a URL when an unauthenticated URL does not include and/or pertain to an application. In this case, text message transmission server 120 may cause the URL to be displayed as a string, with no external link. Further to the example embodiment, a preview of a web page corresponding to the URL may be provided as screenshot of the web page or a corresponding page in mirroring website of the original site may be provided.

Block 480 illustrates an example of a screen displaying a URL when an unauthenticated URL includes or otherwise pertains to an application. In this case, text message transmission server 120 may cause the URL to be displayed as a string with no external link but with at least a portion of the application also being displayed.

Figure 5:
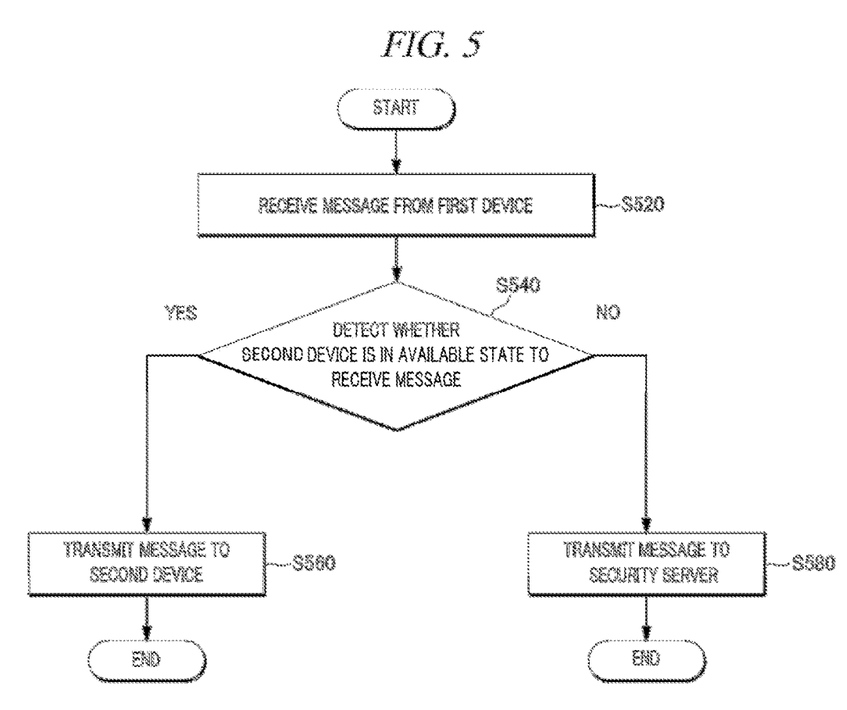
FIG. 5 is a flow diagram of operations implemented for text message management, in accordance with examples of text message management.

FIG. 5 is a flow diagram of operations implemented for text message management, in accordance with examples of text message management described herein. The operations of the processing flow may be implemented in system configuration 1 including servers 120 and 140, as illustrated in FIG. 1. The processing flow may include one or more operations, actions, or functions as illustrated by one or more blocks, 520, 540, 560, and/or 580. Although illustrated as discrete blocks, various blocks may be divided into additional blocks, combined into fewer blocks, or eliminated, depending on the desired implementation. Processing may begin at block 520.

Block S520 (Receive Message from First Device) may refer to receiver 124 receiving a message from transmitting device 100. Processing may proceed from block 520 to decision block S540.

Decision block S540 (Detect Whether Second Device Is In Available State To Receive Message) may refer to device manager 122 detecting or determining whether or not receiving device 160 is capable of receiving the message based on any one or more factors including, but not limited to, any portion of the device information, the security information, and/or a current state of availability.

Thus, text message transmission server 120 may determine that the receiving device 160 is capable and/or available to receive the message; and, therefore, message manager 126 may determine that the transmission path for the message may be directly to receiving device 160. In that event, processing may proceed from decision block S540 to block S560.

Alternatively, text message transmission server 120 may determine that receiving device 160 is not capable and/or available to receive the message; and, therefore, message manager 126 may determine that the transmission path for the message may be to receiving device 160 via security server 140. In that event, processing may proceed from decision block S540 to block S580.

Block S560 (YES: Transmit Message to Second Device) may refer to message manager 126 determining a direct transmission path for the message and transmitter 128 transmitting the message directly to receiving device 160.

Block S580 (NO: Transmit Message to Security Server) may refer to message manager 126 determining an indirect transmission path for the message and transmitter 128 transmitting the message to security server 140 prior before it may be received at receiving device 160. Security server 140 may store the message, and transmit the message to receiving device 160 if receiving device 160 is in available state to receive message.

Figure 6:
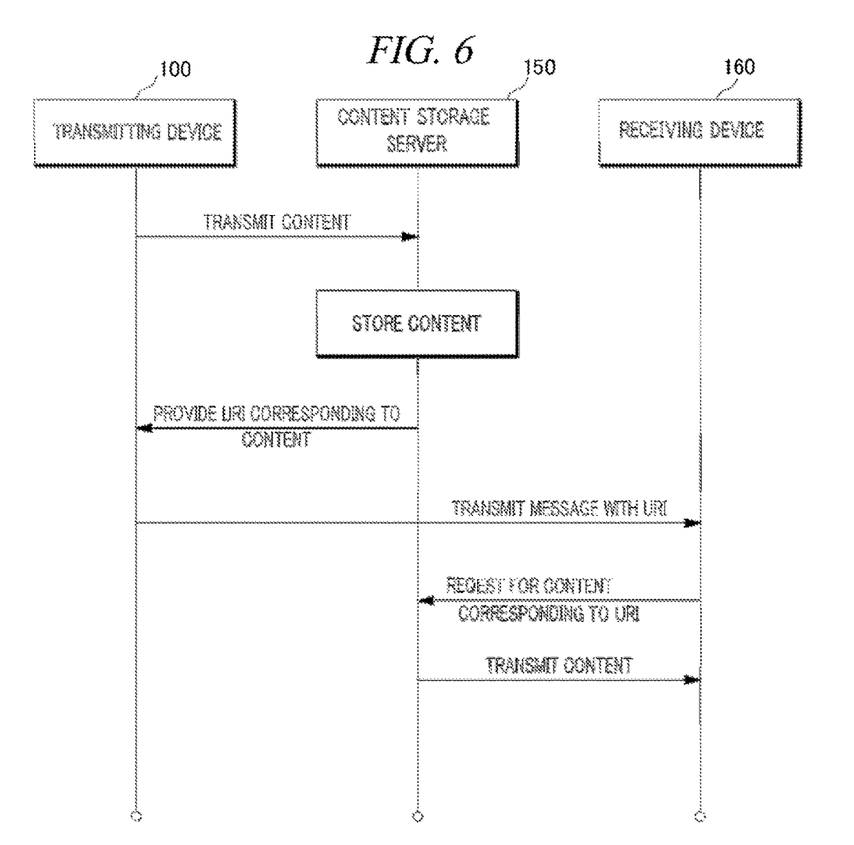
FIG. 6 is a flowchart showing a method for transferring contents in accordance with an exemplary embodiment.

FIG. 6 is a flowchart showing a method for transferring contents in accordance with an exemplary embodiment. In the flowchart, content storage server 150 may receive contents from transmitting device 100, store the received contents, and send a URI, to enable access to the contents, to transmitting device 100.

Content storage server 150 may receive contents from transmitting device 100, store the received contents, and provide a URI (Uniform Resource Identifier) to enable access to the contents by transmitting device 100.

Content storage server 150 may also transfer the stored contents to receiving device 160. Receiving device 160 may receive the URI from the transmitting device 100 and transmit a request for contents with the URI to content storage server 150. Text message transmission server 120 may cause the received URI to be displayed as a button. If the user selects, clicks on, or activates the button, content storage server 150 may directly transfer the contents to receiving device 160.

Figure 7:
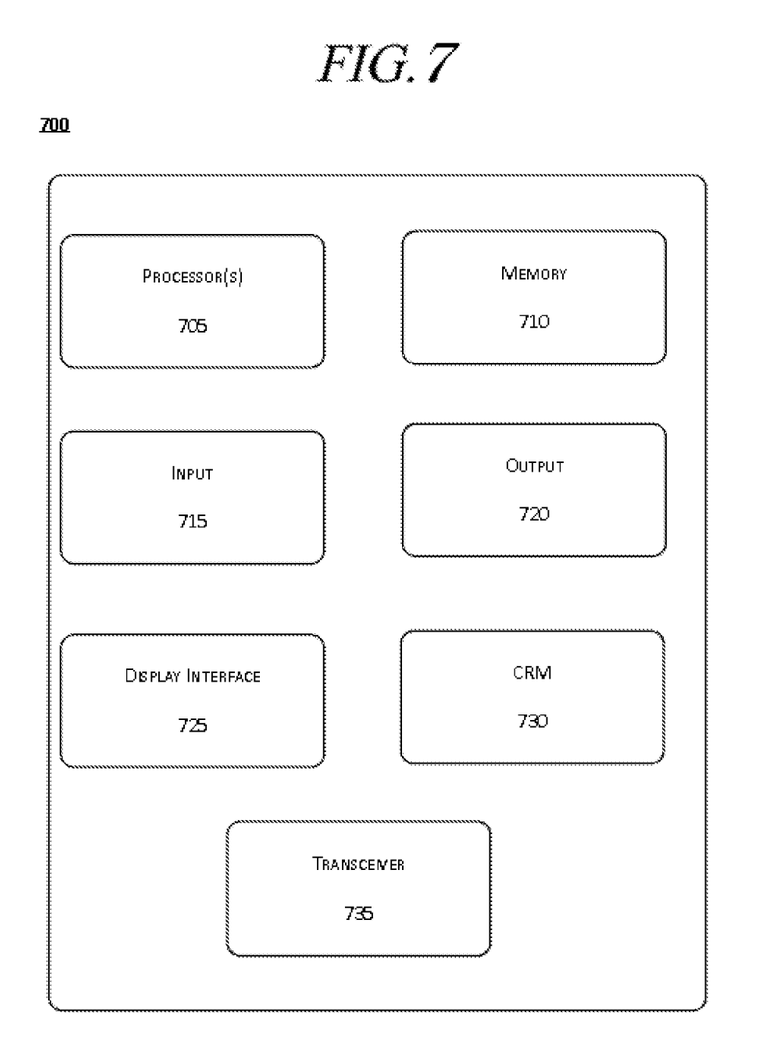
FIG. 7 shows an example computing device on which and by which at least portions of text message management may be implemented, arranged in accordance with one or more embodiments described herein.

FIG. 7 shows an illustrative computing embodiment, in which any of the processes and sub-processes of profile-based content variation may be implemented as computer-readable instructions stored on a computer-readable medium. The computer-readable instructions may, for example, be executed by a processor of any one of text message transmission server 120 and/or device management server 140, as referenced herein, having a network element and/or any other device corresponding thereto, particularly as applicable to the applications and/or programs described above corresponding to the configuration 700 for text message management.

In a very basic configuration, a computing device 700 may typically include, at least, one or more processors 705 and a system memory 710. Computing device 500 may also include one or more input components 715, one or more output components 720, a display component 725, a computer-readable medium 730, and a transceiver 735.

Processor(s) 705 may refer to, e.g., a microprocessor, a microcontroller, a digital signal processor, or any combination thereof.

Memory 710 may refer to, e.g., a volatile memory, non-volatile memory, or any combination thereof. Memory 710 may store, therein, an operating system, an application, and/or program data. That is, memory 710 may store executable instructions to implement any of the functions or operations described above and, therefore, memory 710 may be regarded as a computer-readable medium.

Input component 715 may refer to a built-in or communicatively coupled keyboard, touch screen, or telecommunication device. Further, an input component, if not built-in to computing device 700, may be communicatively coupled thereto via short-range communication protocols including, but not limited to, radio frequency or Bluetooth.

Output component 720 may refer to a component or module, which may be built-in or removable from computing device 700, which is configured to output data to an external device.

Display component 725 may refer to, e.g., a solid state display that may have touch input capabilities. That is, a display component may include capabilities that may be shared with or replace those of the aforementioned input components.

Computer-readable medium 730 may refer to a separable machine readable medium that is configured to store one or more programs that embody any of the functions or operations described above. That is, a computer-readable medium, which may be received into or otherwise connected to a drive component of computing device 700, may store executable instructions to implement any of the functions or operations described above. These instructions may be complimentary or otherwise independent of those stored by memory 710.

Transceiver 735 may refer to a network communication link for computing device 700, configured as a wired network or direct-wired connection. Alternatively, a transceiver may be configured as a wireless connection, e.g., radio frequency (RF), infrared, Bluetooth, and other wireless protocols.

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

We claim:

1. A system, comprising:
 a text message transmission server, implemented as a hardware device, configured to transmit a message received from a first device to a second device, including:
  a device manager configured to manage device information of the second device,
  a receiver configured to receive the message from the first device,
  a message manager configured to determine a transmission path of the message to the second device based on the device information of the second device, and
  a transmitter configured to transmit, to the second device, the message along the determined transmission path; and
 a security server configured to provide a security service of the message,
 wherein the text message transmission server is further configured to:
  determine a level of security vulnerability of the message based on the device information of the second device,
  if it is determined that the level of security vulnerability is low, transfer the message to the second device, and
  if it is determined that the level of security vulnerability is high, transfer the message to the security server,
 wherein the security server is further configured to:
  authenticate a Uniform Resource Locator (URL) included in the message,
  display a hyperlink to the URL that is authenticated,
  display a preview screen of a corresponding webpage to the URL when the URL is not authenticated,
  determine whether the URL relates to an installation of an application, and
  display a notification indicating the installation of the application when the URL relates to the installation of the application.

2. The system of claim 1, wherein the security server is further configured to encrypt the message.

3. The system of claim 2, further comprising:
 a content storage server configured to:
  receive content from the first device;
  store the received content in a database;
  provide a URI (Uniform Resource Identifier) to the first device;
  receive a request for the content with the URI from the second device; and
  transmit the stored content to the second device.

4. The system of claim 3,
 wherein the content storage server is further configured to transmit the content to the security server, and
 wherein the security server is further configured to:
  receive the content from the content storage server, and
  authenticate the received content.

5. The system of claim 1, wherein the device information includes an identifier of at least one of OS (operating system) and a device model of the second device.

6. The system of claim 1,
 wherein the security server is further configured to:
  authenticate the URL by examining whether the URL includes malicious code.

7. The system of claim 1, wherein the security server is further configured to store the message, wherein the device information includes state information of the second device, and
 wherein the text message transmission server is further configured to:
  detect whether the second device is in an available state to receive the message, and
  transmit the message to the second device or to the security server based on a detected state of the second device.

8. A method to transmit a message from a first device to a second device, the method comprising:
 managing device information of the second device;
 receiving the message from the first device;
 determining a transmission path of the message to the second device based on the managed device information of the second device; and
 transmitting, to the second device, the message along the determined transmission path,
 wherein the determining the transmission path of the message includes:
  determining a level of security vulnerability of the message based on the managed device information of the second device, and
  determining the transmission path of the message to the second device based on the level of security vulnerability of the message, and
 wherein the transmitting the message includes:
  if it is determined that the level of security vulnerability is low, transmitting the message to the second device, and
  if it is determined that the level of security vulnerability is high, transmitting the message to a security server that is configured to provide a security service of the message,
 wherein the method further includes:
  authenticating a Uniform Resource Locator (URL) included in the message,
  displaying a hyperlink to the URL that is authenticated,
  displaying a preview screen of a corresponding webpage to the URL when the URL is not authenticated,
  determining whether the URL relates to an installation of an application, and
  displaying a notification indicating the installation of the application when the URL relates to the installation of the application.

9. The method of claim 8, wherein the security server is further configured to encrypt the message.

10. The method of claim 8, wherein the device information includes at least an identifier of at least one of OS and a device model of the second device.

11. The method of claim 8,
 wherein the device information includes state information of the second device, and the determining further includes:

detecting whether the second device is in an available state to receive the message; and determining the transmission path to the second device further based on a result of the detection, wherein the transmitting includes:

transmitting the message to the second device or to the security server based on detected state of the second device, and wherein the security server is further configure to store the message.

12. A non-transitory computer-readable storage medium having thereon computer-executable instructions that, in response to execution, cause a device to perform operations, comprising:

receiving a message from a first device;

managing device information of a second device;

determining a transmission path of the message to the second device based on the managed device information of the second device; and transmitting, to the second device, the message along the determined transmission path, wherein the determining the transmission path of the message includes:

determining a level of security vulnerability of the message based on the managed device information of the second device, and determining the transmission path of the message to the second device based on the level of security vulnerability of the message, and wherein the transmitting the message includes:

if it is determined that the level of security vulnerability is low, transmitting the message to the second device, and if it is determined that the level of security vulnerability is high, transmitting the message to a security server that is configured to provide a security service of the message, wherein the operations further includes:

authenticating a Uniform Resource Locator (URL) included in the message, displaying a hyperlink to the URL that is authenticated, displaying a preview screen of a corresponding webpage to the URL when the URL is not authenticated, determining whether the URL relates to an installation of an application, and displaying a notification indicating the installation of the application when the URL relates to the installation of the application.

13. The non-transitory computer-readable storage medium of claim 12, wherein the security server is further configured to encrypt the message.

14. The non-transitory computer-readable storage medium of claim 12, wherein the device information includes at least an identifier of at least one of OS and a device model of the second device and state information of the second device.

15. The non-transitory computer-readable storage medium of claim 14, further comprising:

detecting whether the second device is in an available state to receive the message; and determining the transmission path to the second device further based on a result of the detection.

16. The non-transitory computer-readable storage medium of claim 15, further comprising:

transmitting the message to the second device or to a security server based on detected state of the second device, wherein the security server is further configure to store the message.

* * * * *